(12) United States Patent
Herbert

(10) Patent No.: US 7,098,638 B1
(45) Date of Patent: Aug. 29, 2006

(54) TOTEM-POLE POWER CONVERTER FOR PROCESSORS

(76) Inventor: Edward Herbert, 1 Dyer Cemetery Rd., Canton, CT (US) 06019-2029

( * ) Notice: Subject to any disclaimer, the term of this patent is extended or adjusted under 35 U.S.C. 154(b) by 151 days.

(21) Appl. No.: 10/710,037

(22) Filed: Jun. 14, 2004

Related U.S. Application Data

(60) Provisional application No. 60/479,707, filed on Jun. 19, 2003.

(51) Int. Cl.
*G05F 1/40* (2006.01)
(52) U.S. Cl. .......................... 323/282; 323/222; 363/16
(58) Field of Classification Search ........ 323/282–288, 323/222, 271, 272, 351; 315/56, 58, 60; 363/16–20
See application file for complete search history.

(56) References Cited

U.S. PATENT DOCUMENTS 6,111,359 A * 8/2000 Work et al. .................... 315/56
6,121,761 A * 9/2000 Herbert ....................... 323/282

* cited by examiner

*Primary Examiner*—Rajnikant B. Patel

(57) ABSTRACT

The same totem-pole switch configuration that is used for a data bus driver is suitable for switched-current power control on a processor. The switched-charge power converter has very fast dynamic response for changes in current, from no load to full load and back again in the time that it takes to turn a MOSFET on, then off again. For a number of reasons, the preferred location for the power control circuitry is on the processor die itself, or as close to it as possible. Switched-charge circuitry may be added, for very fast and accurate step changes in voltage.

9 Claims, 6 Drawing Sheets

Prior Art

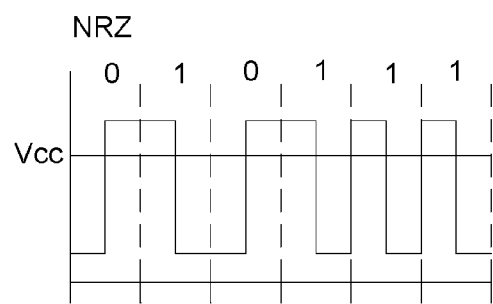
*Fig. 12*
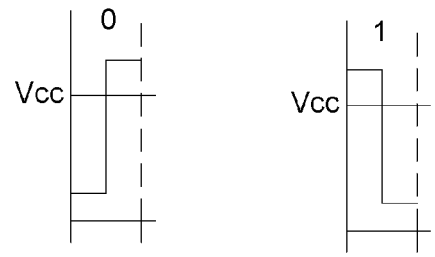
*Fig. 12a*  *Fig. 12b*
Modified NRZ, D = 20%   Modified NRZ, D = 80%
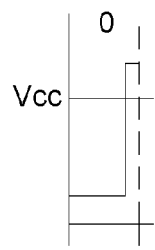 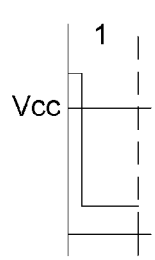   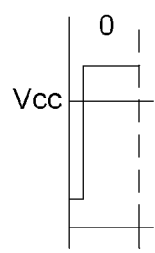 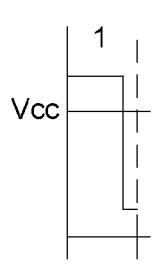
*Fig. 13a*  *Fig. 13b*   *Fig. 14a*  *Fig. 14b*

TOTEM-POLE POWER CONVERTER FOR PROCESSORS

CROSS REFERENCE TO RELATED APPLICATIONS

This application is a continuation in part application of a provisional patent application of the same name, Ser. No. 60/479,707, filed 19 Jun., 2003.

BACKGROUND OF INVENTION

Prior art power controllers for processors are usually buck converters, as shown in FIG. 1. They suffer from poor response. Multi-phase buck converters, as shown in FIG. 2, are a significant improvement, but they are still slow.

A switched-current power converter, as taught by U.S. Pat. No. 6,121,761, "Fast Transition Power Supply", issued 19 Sep., 2000, and shown (simplified) in FIG. 3 is much faster. A variant (U.S. patent application Ser. No. 10/709,484, "Switched-current Power Converter" filed 8 May, 2004 issued 27 Dec., 2005 as U.S. Pat. No. 6,979,982) having a plurality of switched-current sources is shown in FIG. 4. The plurality of current sources can be generated using one current source and a matrix transformer. The current can transition from zero to full load and back to zero very quickly, essentially the time that it takes to close, then open, solid-state switches. The above patent and patent application are owned by the same entity as the present invention, and they are incorporated herein by reference.

In the power converter of FIG. 4, the switches are located outside of the processor, though preferably they are very close to it.

SUMMARY OF INVENTION

FIG. 5 shows that for optimum timing and minimum loop inductance, the switches should be located within the processor, either immediately proximate to the processor die or embedded within it. If the switches are shown as MOSFETs, the circuit if FIG. 6 is the result. Note, the voltage on the input will be low or high, respectively, depending upon whether the bottom or the top MOSFET switch is turned on.

FIG. 7 shows a totem pole output driver. Note the similarity to the switched-current converter cell of FIG. 6. When the bottom MOSFET is on, the output is low, when the top MOSFET is on, the output is high, with a voltage somewhat lower than the Vcc bus. The waveform is shown in FIG. 8.

FIG. 9 shows that a constant current can be injected into a totem pole cell, and the voltage will be low if the bottom MOSFET is on, and somewhat over Vcc if the top MOSFET is on. The waveform is shown in FIG. 10. Assuming a relatively high impedance elsewhere on the data output line, the current will either flow through the top MOSFET to Vcc or it will flow through the bottom MOSFET to the return. If a plurality of constant current sources are connected to a plurality of totem pole cells, the current flowing into Vcc can be any amount from zero to the sum of the current sources, and it can transition as fast as the totem pole cells can change state.

A totem pole cell may be optimized for power control or as a data driver, depending upon the amount of current it controls. A larger, higher current totem pole cell may be too slow for high speed data flow, but none the less it may be able to handle some data. A smaller, faster totem pole cell may handle too little power to be characterized as a power controller, but non-the-less, its contribution to power control may be beneficial and collectively with many other similar totem pole cells, may be significant.

BRIEF DESCRIPTION OF DRAWINGS

FIGS. 12, 12a and 12b show a modified "NRZ" data waveform.

FIGS. 13a, 13b, 14a and 14b show a modified "NRZ" data waveform further having a variable duty cycle.

DETAILED DESCRIPTION

Figure 1:
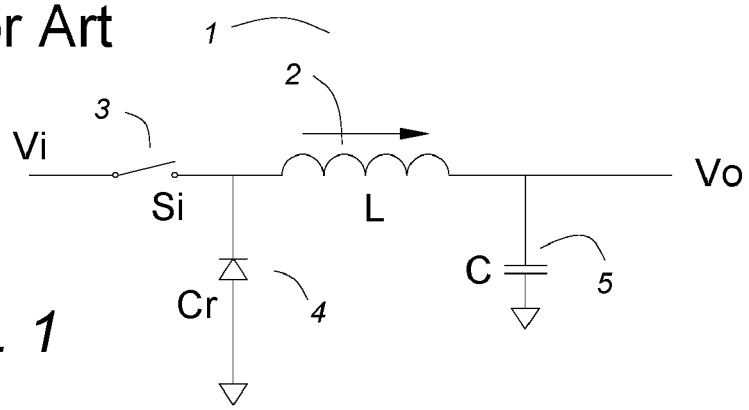
FIG. 1 shows a prior art buck converter.

Prior art power controllers for processors frequently are buck converters, for example, the buck converter 1 shown in FIG. 1. They suffer from poor dynamic response. An inductor 2 and a capacitor 5 average the voltage output Vo to equal the input voltage Vi times the duty cycle of a switching means 3. A catch diode means 4 conducts current into the inductor 2 when the switching means 3 is open.

Figure 2:
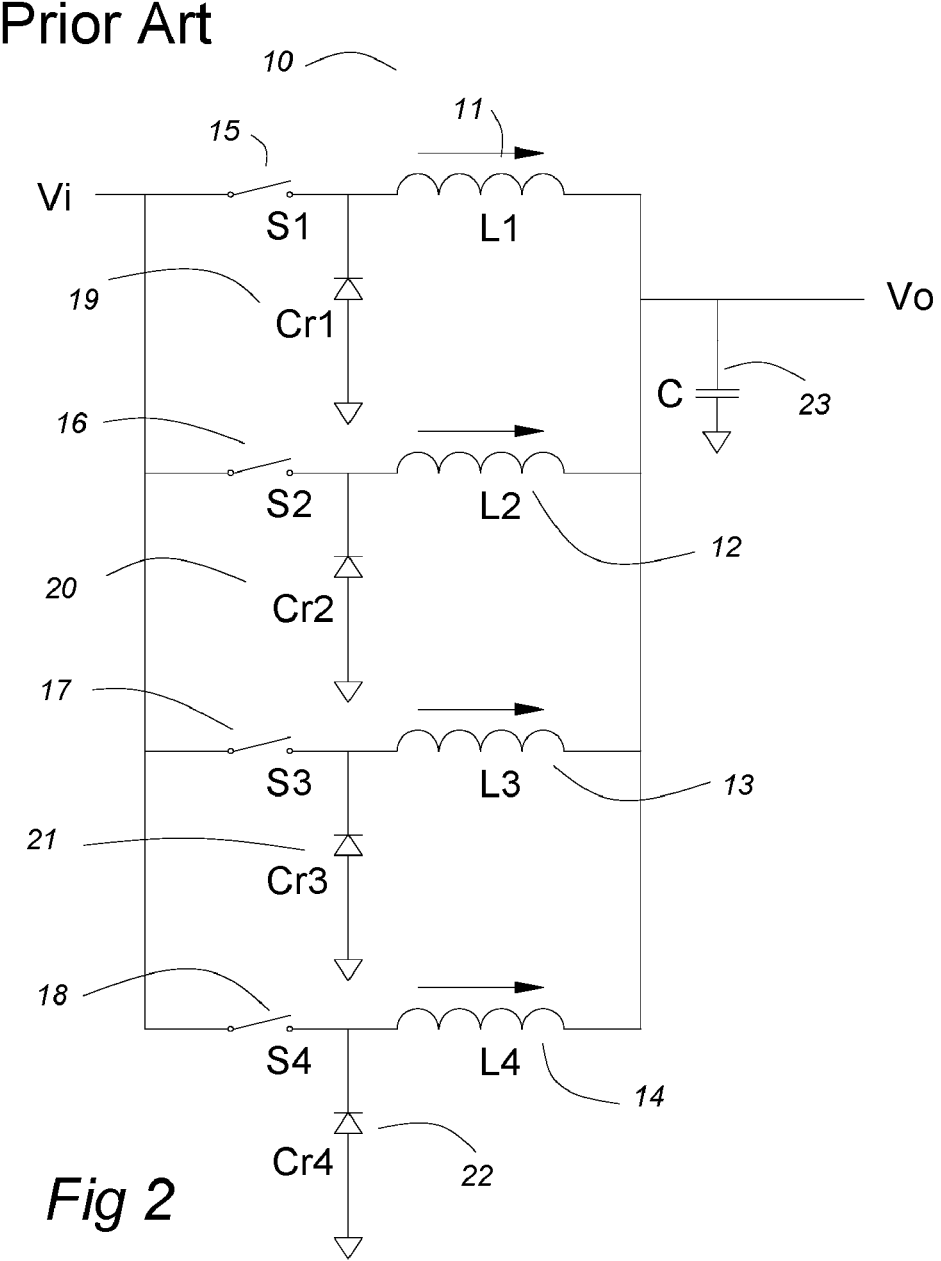
FIG. 2 shows a prior art multi-phase buck converter.

Multi-phase buck converters, for example, the multiphase buck converter 10 shown in FIG. 2, are a significant improvement, but they are still slow. A plurality of inductors 11 through 14 and a capacitor 23 average the output voltage Vo to equal the input voltage Vi times the duty cycle of a plurality of switching means 15 through 18. A plurality of catch diodes 19 through 22 conduct current into the respective inductors 11 through 14 when the respective switching means 15 through 18 are open.

Figure 3:
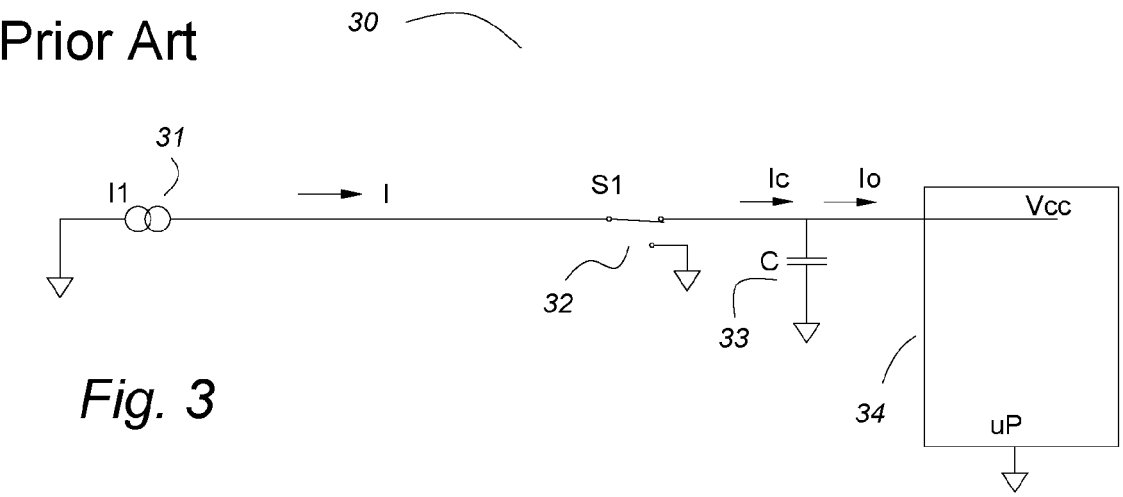
FIG. 3 shows a single section of a prior art switched current power converter.

A switched-current power converter 30, as taught by U.S. Pat. No. 6,121,761, Fast Transition Power Supply, a single section of which is shown in FIG. 3, is much faster. A current I from a source of constant current 31 is direct by a switching means 32 either to return or to a capacitor 33 to supply a current Io to a voltage source input Vcc of a processor 34. A controlled current Ic into the capacitor 33 can be zero or equal to the current I, depending upon the state of the switching means 32, and can transition between values as fast as the switching means 32 can switch. This can be very fast indeed. The single section is shown for illustration and to explain the principle of operation. A practical switched current power converter has a plurality of similar sections, as explained below.

Figure 4:
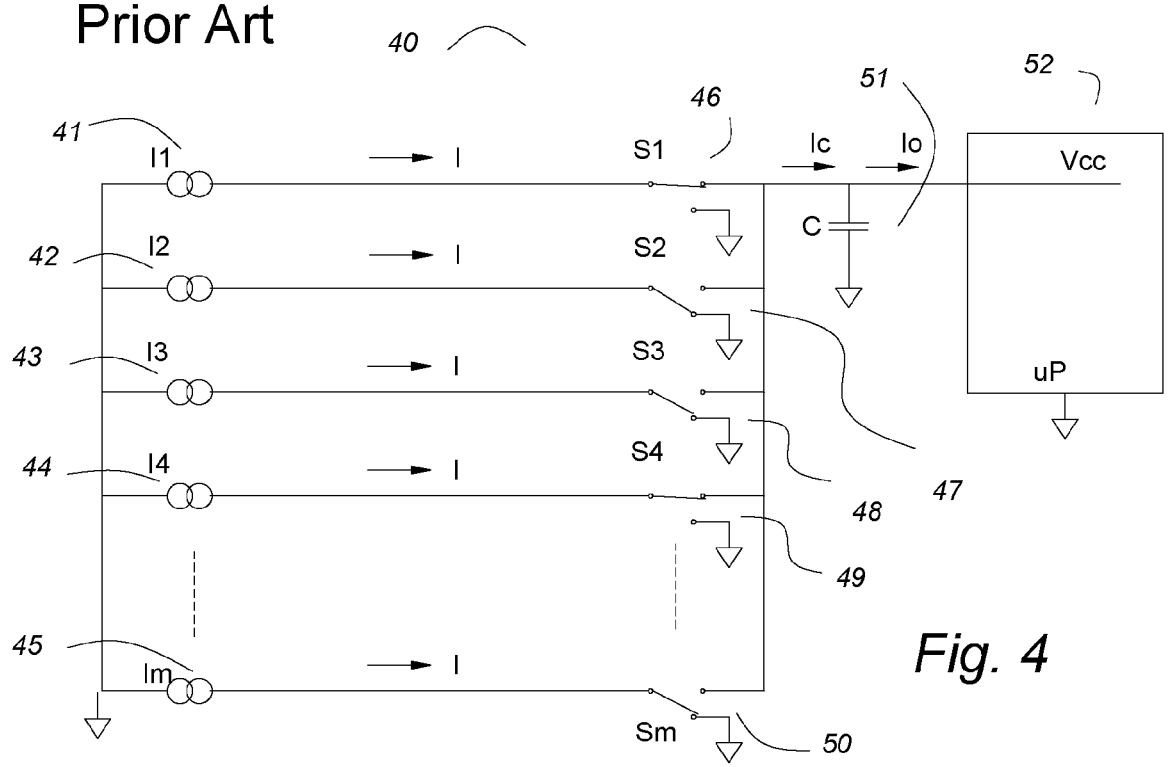
FIG. 4 shows a prior art switched current power converter.

FIG. 4 shows a prior art switched current power converter 40 (U.S. patent application Ser. No. 10/709,484, "Switched-current Power Converter") having a plurality of current sources 41 through 45 each producing an essentially equal constant current I. The plurality of current sources 41 through 45 can, as an example, not a limitation, be generated using one current source and a matrix transformer. The current can transition from zero to full load and back to zero very quickly, essentially the time that it takes to close, then open, a plurality of solid-state switching means 46 through 50.

In the switch current power converter 40 of FIG. 4, the plurality of switching means 41 through 50 are located outside of a processor 52, though preferably they are very close to it. In operation, the plurality of switching means 46 through 50 may switch in various combinations to switch currents from the respective current sources 41 through 45 individually either to ground or to a capacitor 51. A control current Ic equals the number of the plurality of switches 46 through 50 that are switched to the capacitor 51 times the current I. The value of the control current Ic can vary as rapidly as the plurality of switching means 46 through 50 can change state. With solid state switches, like MOSFETs as an example, not a limitation, that can be very fast indeed, nearly instantaneous.

Figure 5:
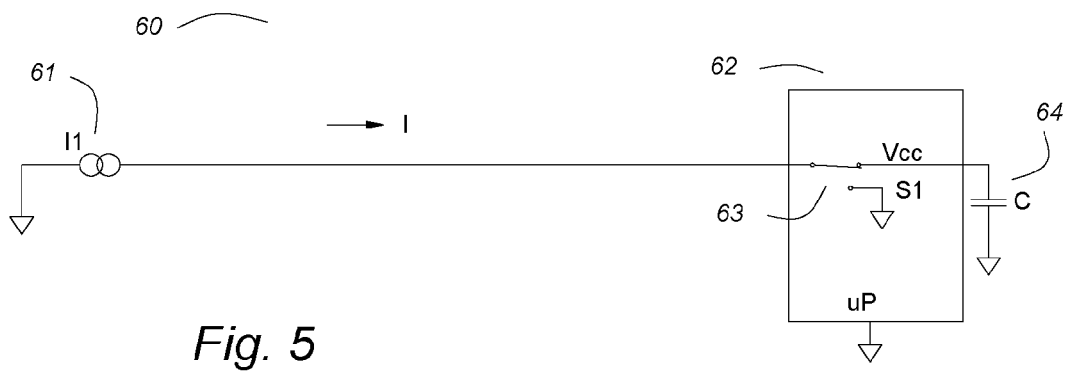
FIG. 5 shows a single section switched current power converter in which the current switches are inside a processor package.

FIG. 5 shows a single stage switched current power converter 50 arranged for optimum timing and minimum loop inductance by having the switching means 63 located within the processor package 62, either immediately proximate to the processor die or embedded within it. A capacitor 64 may be outside the processor package 64, as shown, or part or all of the capacitance may be inside the processor package 64. Most modern processors have some internal capacitance, but the bulk of the capacitance is usually external as shown. The capacitor 64 stores charge, and to the extent that the charge on the capacitor 64 can be held constant, the voltage Vcc will be constant. Holding the charge constant, and thus the voltage Vcc, is the objective of controlling the current Ic very rapidly to conform, on average, to the output current Io.

Figure 6:
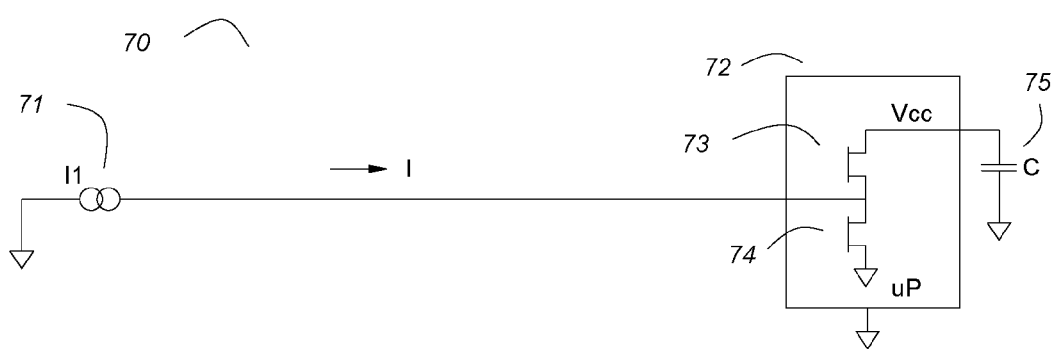
FIG. 6 shows that a practical switch arrangement for a section of a switched current power converter within a processor package bears a strong resemblance to a totem pole bus driver circuit.

If the switching means 63 is shown as MOSFETs, the switched current power converter 70 of FIG. 6 is the result. Note, the voltage on the input will be low or high, respectively, depending upon whether the bottom MOSFET switch 74 or the top MOSFET switch 73 is turned on. An external capacitor 75 is shown, to store charge.

In FIGS. 5 and 6, single sections are shown to explain the function of the switched power converter, but in a practical system a plurality of similar circuits would be used, as shown in FIG. 4.

Figure 7:
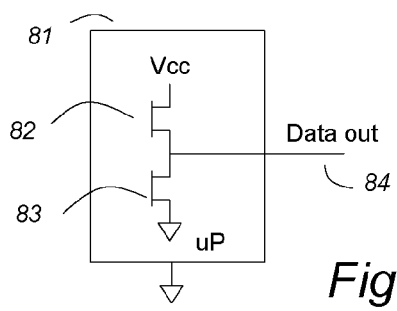
FIG. 7 shows a prior art totem pole data driver.
Figure 8:
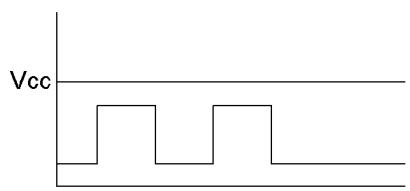
FIG. 8 shows its voltage waveform.

FIG. 7 shows a prior art totem pole output driver circuit 80. In a processor 81, if a first MOSFET 82 is turned on, a data output signal 84 is "HIGH", with a voltage somewhat lower than the Vcc bus. If a second MOSFET 83 is turned on, the data output signal 84 is "LOW". Note the similarity to the switched-current converter cell of FIG. 6. The waveform is shown in FIG. 8.

Figure 9:
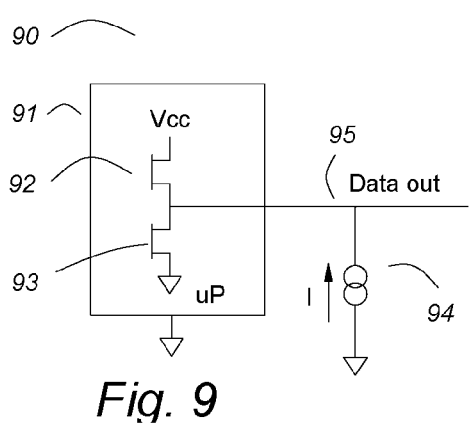
FIG. 9 shows a single section of a switched current power converter that can also function as a data driver.
Figure 10:
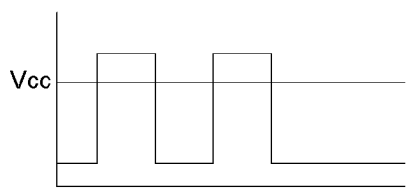
FIG. 10 shows its voltage waveform.

FIG. 9 shows that in a switched current converter 90 a constant current I from a source of constant current 94 can be injected into a totem pole cell of a processor 91, and the voltage will be low if the bottom a MOSFET 93 is on, and somewhat over Vcc if a top MOSFET 92 is on. The waveform is shown in FIG. 10. Assuming a relatively high impedance elsewhere on the data output line, the current will either flow through the top MOSFET 92 to Vcc or it will flow through the bottom MOSFET 93 to the return. If a plurality of constant current sources are connected to a plurality of totem pole cells, the current flowing into Vcc can be any amount from zero to the sum of the current sources, and it can transition as fast as the totem pole cells can change state. Thus a plurality of totem pole cell like circuits can be used in reverse to control the voltage on Vcc just as in the switched power converter 40 of FIG. 4.

A totem pole cell with current injection from an external constant current source may be optimized for power control or for data, depending upon the amount of current it controls. A larger, higher current totem pole cell may be too slow for high speed data flow, but none the less it may be able to handle some data. A smaller, faster totem pole cell may handle too little power to be characterized as a power controller, but non-the-less, its contribution to power control may be beneficial and, collectively with many other similar totem pole cells, may be significant.

In addition, the totem pole cell of FIG. 9 which sinks the current from a constant current source in either state may be a superior data cell, having a larger voltage margin and thus a greater noise immunity. Whereas a top MOSFET with higher resistance degrades performance when it causes a voltage drop from Vcc, it may benefit a current sinking cell, as it would increase the high state voltage. Assuming a wide data bus with a large number of data cells which sink current in the high state, the contribution to Vcc is twofold. First, when high, it is not a load on Vcc, as in a usual totem pole driver. Second, when high, it is a source of current into Vcc, therefore reducing the current required from other sources, such as a VRM Pod, for processor functions.

A totem pole cell that sinks a constant current source can be a tri-state driver only if there is some provision for the current to continue to flow during the off state. If it is a bi-directional data bus, one end of the bus or the other must always be on, to provide a current path, and both ends can be on, overlapping, during transition as long as both are in the same state (HIGH or LOW). Another possibility would be to remove the drive currents during the off state, particularly for long quiescent times.

It is practical to generate a plurality of generally equal constant current sources with a matrix transformer as taught in Ser. No. 10/709,484. If a matrix transformer is operated at 100 percent duty cycle, so that one side of the push pull winding or the other is always on, or if a full bridge or half bridge circuit has current flow in one direction or the other without an off time, and if the transformer is powered by a constant current source, then the rectified output of every stage is a constant current source as well. With a one turn primary and a one turn secondary in each stage, the rectified outputs will comprise a plurality of constant current sources with each one equal to the primary input current.

Figure 11:
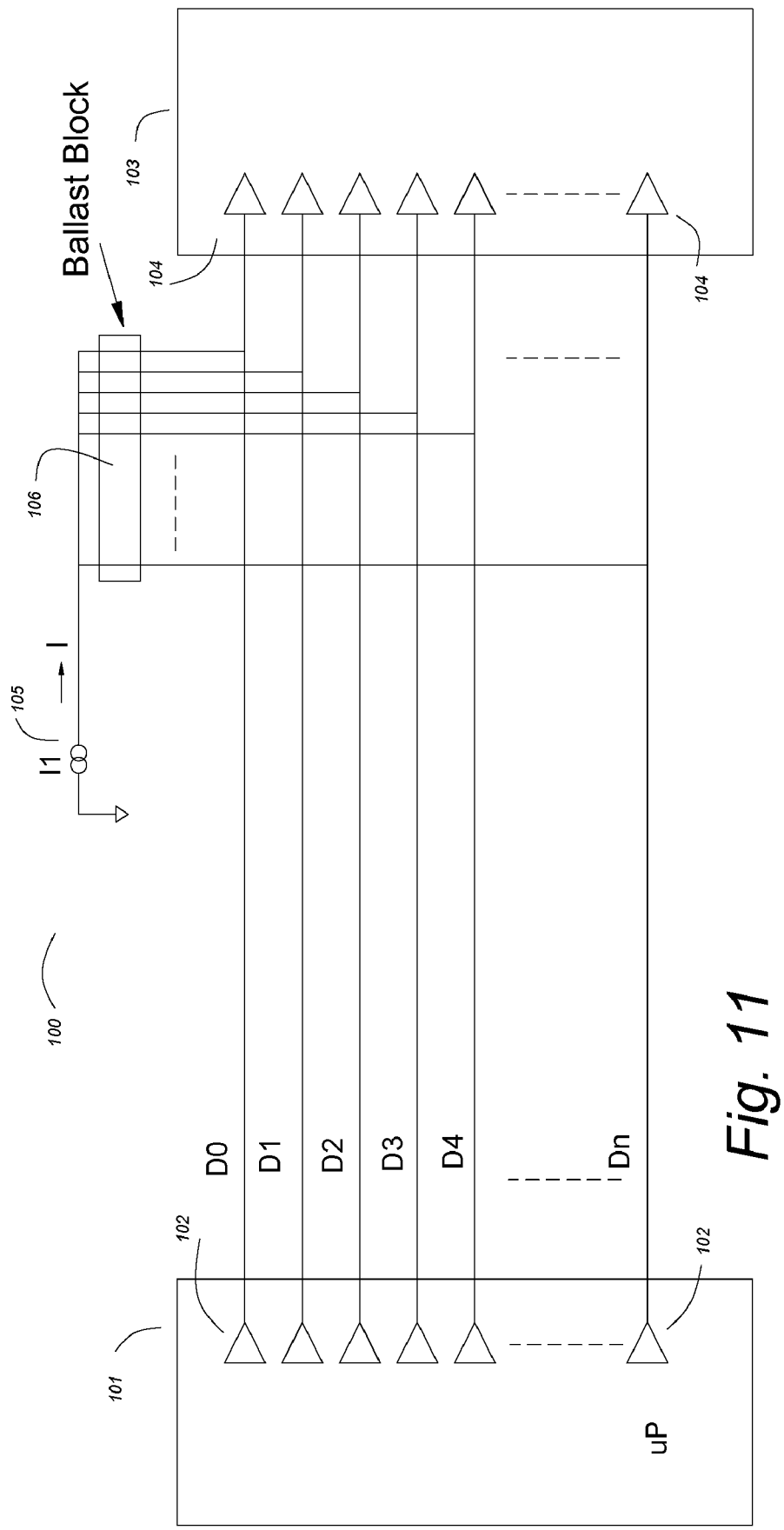
FIG. 11 shows a processor having a plurality of combined switched current power converter inputs and data outputs driving a data bus to a data receiver. A ballast block divides a current from a source of current into a plurality of generally equal smaller currents.

On the other hand, generating a large number of small, generally equal constant current sources is more of a problem. FIG. 11 shows a processor 101 having a plurality of totem pole data cells 102—102 that send data to a data receiver 103 having a plurality high impedance data sense inputs 104—104. A current I from a source of constant current 105 can be divided into a plurality of generally equal constant currents using a ballast block 106. If currents are directed into a number of parallel paths, the currents will divide equally if the average voltage and the impedance of each paths are equal. Therefore, with some care, the current I from the source of constant current 105 will divide fairly well if the resistances of the several data bus lines are equal and the impedances of the MOSFETs comprising the plurality of totem pole data cells 102—102 are equal, provided that the totem pole data cells 102—102 are all in the same state. (Intentionally unequal currents can be generated as well, by intentionally making the impedances unequal).

The ballast block 106 may be a small block of magnetic material, perhaps ferrite or powdered metal, as illustrations, not limitations, with through holes having wires in them comprising a plurality of very small parallel inductors. Small, so that they are inexpensive and take up very little board real estate, but still large enough so that the currents through them will not change appreciably for the duration of a data pulse. (In as much as individual conductors have an inductance, if only a small inductance is needed, the stray inductance of an array of conductors may be sufficient). Accordingly, if the totem pole cells are all in the same state, all high or all low, most of the time, and make only very brief pulses to the other state for data transfer, then the currents will remain generally unchanged.

When the totem pole cells are used in reverse just to control the voltage on Vcc, the various totem pole cells will change state so as to modulate the current into the storage capacitors on Vcc to maintain the charge nearly constant. Without regard to the ballast block, the duty cycle of individual totem pole inputs would be unimportant as long as the overall average duty cycle was correct to achieve the instantaneous current required. This is not so using ballast blocks, as the average voltage on the several current paths must be equal over a time that is short compared to the time constant of the inductors. Thus the various totem pole cells should be operated with equal duty cycle, but the duty cycles are preferably multi-phased and interleaved to minimize the ripple voltage on Vcc.

When used to transfer data as well as to control the voltage Vcc, obviously the totem pole cells cannot all be in the same state all of the time and still output useful data. None the less, the currents will remain fairly well matched if the duty cycle of each line is the same over time. That is, if, over a time that is short compared to the time constant of the ballast block, the average voltage on each line is the same. If every line spends x percentage of the time low and (100−x) percentage of the time high, then the currents will remain matched. There are several ways that this can be accomplished.

One is if each data word is preceded (or followed) by its complement, having the same timing pulse width, then the word and its complement will average out.

Another scheme would be to encode the data using a modified "NRZ" data stream. NRZ data is usually used with serial data buses that are transformer coupled, to ensure equal polarity over time so that the transformer excitation does not have a dc component and saturate the core. The same considerations can be applied to the ballast block 105, except that the objective is to achieve an equal average voltage, not zero average voltage.

In this invention, it is contemplated that a primary function of the totem pole cells is to control the voltage on Vcc, and that may be the only function in many applications. However, given the large number of input pins devoted to supplying power to a typical processor, there may be an advantage to using these input pins for the dual purpose of supplying power and transferring data. As an example, not a limitation, the power input pins could, using the teachings above, provide data and control to the power converter itself or to other slower peripherals within a computer. The higher voltage on such "data" would have a higher signal to noise ratio, and their lower impedance may be able to drive longer lines and reduce susceptibility to noise.

This is not to lose track of the advantage that may be enjoyed by injecting current into every data output line. Such a configuration may contribute significantly to the current into the Vcc of the processor, reducing the reliance on the primary power source. It also has the advantage of having a higher voltage for the data signals, which would result in a higher signal to noise ratio. It may also provide a better drive to other circuits that may not operate at as low a voltage as the processor may.

FIG. 12 shows a modified NRZ waveform. This wave form also presents a constant average voltage to the data lines, and the currents would remain matched through the ballast block. FIG. 12*a* shows a "0", and FIG. 12*b* shows a "1". This modified NRZ waveform would yield an average 50% voltage and average 50% current, so the totem pole cells would have to control the current by varying their duty cycles (but with each having the same duty cycle) between data transfers.

If the data bus is a combined power control and data bus, then the NRZ waveform can be modified to have a duty cycle which can be varied over a wide range while still preserving the integrity of the data. FIGS. 13*a* and 13*b* show modified NRZ waveforms having a low duty cycle, and FIGS. 14*a* and 14*b* show modified NRZ waveforms having a high duty cycle.

If a plurality of totem pole cells is used to control power, there will be a constant circulating current. This means that there is a constant loss in the die, either in the upper MOSFETs as current is directed to Vcc or in the lower MOSFETs as the current is circulated back to the return. Whether the benefits of this method of power control are worth the penalty of this constant loss is a trade off of the system. It may very well be worthwhile, for the following reasons: First is the advantage of having constant currents in the power distribution bus. With constant currents, there is no di/dt in the power distribution bus, so the loop inductance is no longer a factor. The distribution bus can be quite long and the prime power source can be far away from the processor. With no di/dt, the near field is constant, so there is very little EMI generated by the distribution bus.

Second is the dynamic response. The currents into the storage capacitor can change from zero to full load and back just as quickly as the MOSFETs can be turned on and turned off, an extremely short time. This has a number of advantages. One is that the capacitors can be much smaller, as the current into the capacitor can be brought into compliance with the load current out of the capacitor very quickly.

A third advantage is that the voltage control can be very precise, with very small errors, even during large current transients because errors can be detected and corrected very quickly. With more precise voltage control, the processor can be operated at a lower voltage for a significant savings in power. For example, if the MOSFETs have a 50 mv drop when on, the power loss will be about five percent of full load. If the processor can operate at 90 percent of the Vcc that it otherwise would, the power consumption is 81 percent, a net savings at full load of 14 percent. Unfortunately, the same five percent of full load power is present even at lower loads, but the break-even point would be about one third of full load and there would be a benefit at any greater load.

Fourth, with orders of magnitude less delay while current ramps up, then down, the total time that the current is above quiescent will be much shorter, for a significant savings in power as well as a having faster operational response to whatever data processing task required the increased current.

Fifth, with a plurality of constant current sources, the current can be switched to the part of the processor die where it is needed, reducing the consequences of unequal power load use on the die.

Sixth, the on resistance of MOSFETs that are part of the processor die may be superior MOSFETs. In a MOSFET, the on resistance is a function of the number of cells and their voltage rating. The processor has a much better cell density than most power MOSFETs, and its voltage rating is particularly low. Accordingly, for a given area of silicon, the embedded MOSFETs are likely to have a much lower on-resistance than a comparable discrete or integrated circuit power MOSFET.

The plurality of constant currents need not be constant at all times. For some modes of operation, the currents can be reduced to a low value. If for some mode the currents can be reduced to 50 percent of the maximum, the power loss will be reduced by 75 percent. If the current can be reduced to 30 percent, for example, in a standby mode of operation, the power loss in the circulating currents will be reduced by 90 percent. Currents can be changed either by ramping down the constant current source or by switching currents in or out of the prime current source, the first method being simple but slow, and the second method being very fast, perhaps too fast. With reference to U.S. patent application Ser. No. 10/708,523, "Buck (or Boost) Converter with Very Fast Output Current Transitions and Low Ripple Voltage" by using a dynamic inductor output for the prime current source, the current can be transitioned very quickly while still having a defined di/dt determined by the circuit design. This patent application is owned by the same entity as the present invention, and it is incorporated herein by reference.

Further, if the processor has a known minimum current, one or more constant current sources totaling that minimum current can be connected directly to Vcc without switching. This directly connected minimum current may also be varied at the prime current source according to the mode of operation. Yet another choice is to have some portion of the current control on the processor die as embedded totem pole cells and have another portion located nearby (within and/or outside of the package). Current control of a portion of the current on the processor die would allow very fast voltage adjustment while most of the circulating current and its losses would be elsewhere.

There is a system trade off in the number of power input pins to use and how they are grouped. A reasonable number of constant current sources may be in the order of ten to twenty or somewhat more. On the other hand, a processor may have a large number of power input pins, and there is the possibility of terminating each with a totem pole cell circuit for power control. The ten to twenty constant current sources can be divided using ballast blocks to get a multiple, say 80 to 150. For the pins that are wired through a ballast block from one constant currant source, the average voltage on wires from the ballast block must be the same, which means that each pin must have the same duty cycle. This can be accomplished with a circulating algorithm. To envision how it works, consider a PWM pulse going into a shift register. All of the shift register outputs see the same pulse width (or duty cycle) but shifted in time. Using a shift register or a ring counter are possible control methods, but it is better to implement the function in logic so that the current can be adjusted more quickly if there is a sudden large change in demand. (In as much as a length of wire has inductance, it may be that the wire runs alone will have sufficient inductance. Such inductors are included when a ballast block is cited, even if there are no separate physical inductor components).

It is likely that no additional mask steps would be needed to implement totem pole cell power control. The power control inputs have the same MOSFET to Vss and the same MOSFET to Vcc as ordinary data cells, except that the current is higher. Just as power MOSFETs comprise a large number of cells, so would these MOSFETs, enough cells to handle the current with an acceptable voltage drop. The total number of cells would be a function of the total switched current, but how they are grouped would be a trade off of the specific design. One design might use ten inputs, and switch 10 amperes each, requiring a small number of MOSFETs, each comprising a very large number of cells Another might use 80 inputs of 1.2 amperes each, requiring a larger number of much smaller MOSFETs. The total cells used would be about the same.

Figure 15:
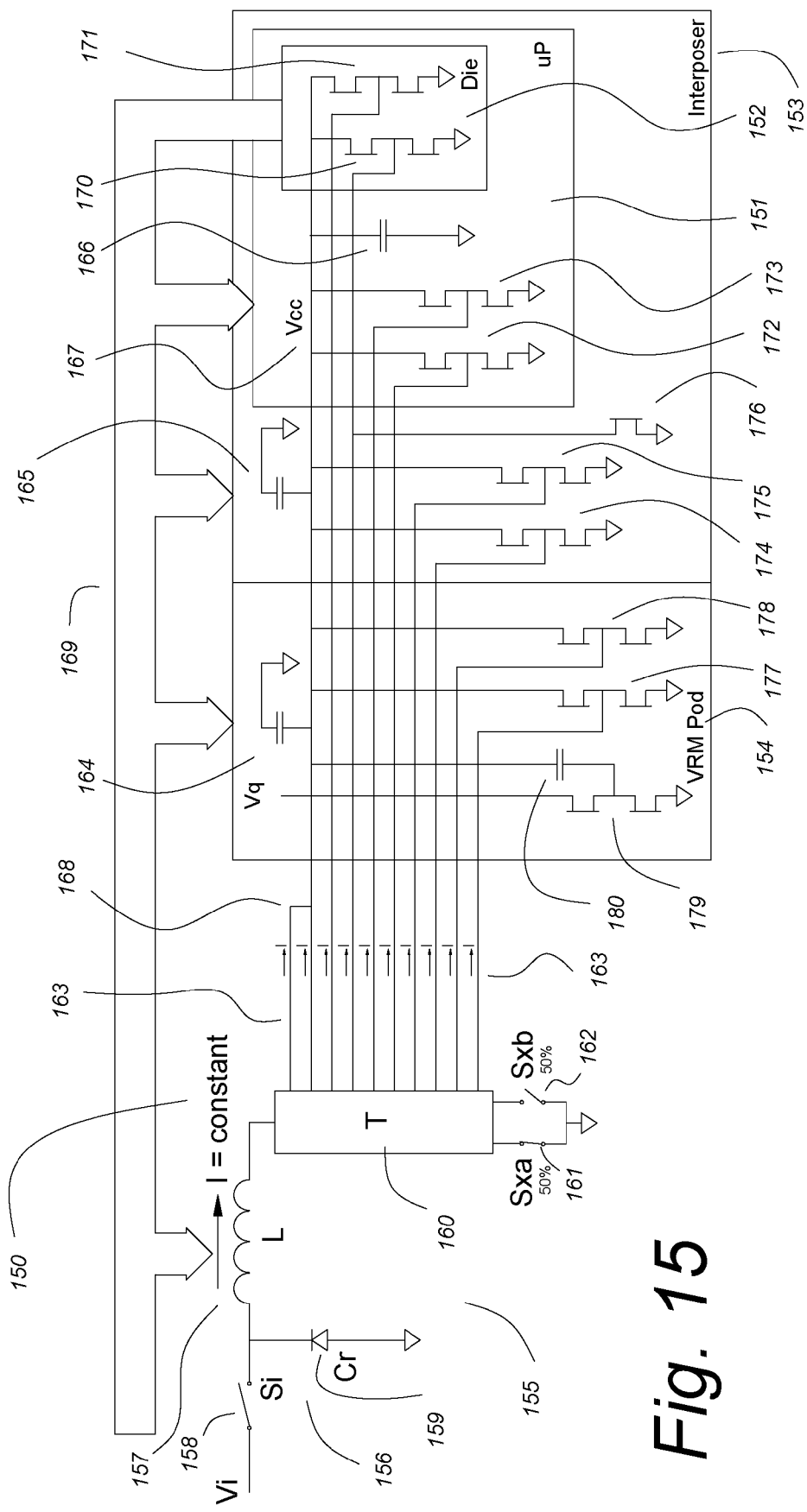
FIG. 15 shows an example of a processor with a switched power converter with a variety of current and voltage control means, to show the flexibility of this invention when combined with a switched current power converter.

FIG. 15 shows a switched current power converter 150 that is powering a processor 151. The processor 151 has a processor die 152, and it may be mounted on an interposer 153. The switched current power converter 150 may comprise a source of multiple constant currents 155 having a plurality of constant current outputs 163—163 and switched current switching means distributed across a voltage regulator module (VRM Pod) 154, the interposer 153, within the processor package 151 and on the processor die 152.

As an illustration, not a limitation, the source of multiple constant currents 155 may comprise a constant current source 156 comprising an inductor 157, a switching means 156 and a catch diode means 159. One skilled it the art of power conversion will recognize the constant current source 156 as a usual buck converter, though it has no output capacitor and it is controlled by a controller (not shown) such that the current I in the inductor 157 is held approximately constant. The source of multiple constant currents 155 may further comprise a matrix transformer array 160 excited by the constant current I and switched by push-pull switching means 161 and 162 operated at "100% duty cycle".

If the secondaries of the matrix transformer array 160 are full wave rectified, the result is an array of constant current sources 163—163 each of which has a constant current output of value I (assuming a one to one ratio in each section of the matrix transformer). The use of a buck converter driving a matrix transformer array is an example, not a limitation. Any plurality of constant current sources may be used with this invention with equivalent results. "Constant current", as used in the specification and the claims, is not an absolute; it allows some variation within the error and control band of the current regulating scheme used as well as different levels of "constant current" for different modes of operation of the processor.

First, please note the two paralleled and unswitched constant current sources that are connected in a connection point 168 to Vcc. These are connected directly to the processor and the several storage capacitors 164, 165 and 166 in the VRM Pod 154, on the interposer 153 and within the processor package 153. This provides an unvarying minimum current to the processor and is a preferred configuration if the processor has a known minimum operating current regardless of its state or operating mode. This is often the case with processors, and by not switching this current, there are no switch losses associated with the minimum current.

The next two of the constant current sources 163—163 are connected to switching means 170 and 171 on the processor die 152. There may be any number of such switching means on the processor die, and the illustration of just two is to keep the drawing simple while still showing the principle of the invention. Their function and operation are as described in the discussion of FIG. 6 above.

The next two of the constant current sources 163—163 are connected to switching means 172 and 173 that are not on the processor die 152 but that are located within the processor package 151. The next two of the constant current sources 163—163 are connected to switching means 174 and 175 that are located outside of the processor package 151 and on the interposer 153. Finally the last two of the constant current sources 163—163 are connected to two switching means 177 and 178 that are located in the VRM Pod 154. In a practical system for controlling the voltage Vcc for a processor 151 the location of the various switching means 172 through 178 would be a design trade off. In present processor power supplies, the voltage control is usually entirely within the VRM Pod 154 or its functional equivalent. However, one of the teachings of this invention is the use of switched current power control, and that the closer to the processor die the switching means are, the less will be the effects of rapid changes of processor load current (di/dt) due to the stay inductance of the power distribution.

Note that there is an additional "outside switching means" 176 to return on the interposer 153. In some circumstances, it may be undesirable to have a current circulating through the return of the processor continuously even though the current is not needed to sustain Vcc. In such circumstances, the outside switching means 176 may be turned on and the switching means 170 may be turned off. There may be a plurality of outside switching means configured in this manner, and the illustration of only one is to keep the drawing simple. The outside switching means may comprise a totem pole driver as well, with a switching means to Vcc. However it is contemplated that the usual application for an outside switching means would be for modes of operation where the current from the attached constant current source will not be needed and the outside switching means is turned on to reduce circulating current and its attendant power loss within the processor (or other integrated circuit). With reference to US. Pat. No. 6,121,761, "Fast Transition Power Supply", a switched-charge voltage step change capability can be added, as represented by a switched charge switching means 179 and a charge transfer capacitor 180 in FIG. 15. It is preferred to use external MOSFETs, as the peak current is quite large. Also, the capacitors are very likely external to the processor, and the charge should be switched to the capacitor directly and not put through the processor interconnections. (If the capacitors were entirely within the processor package, that would be a different situation. Then the charge switching should be done there).

There are many tradeoffs in the method of control. The preferred method relies on the processor itself to control the switched-current totem pole cells, both in response to errors and in anticipation of load changes. To represent this, FIG. 15 shows a data bus 169 from the processor 152 to the various switches of the circuit as well as to the constant current buck regulator 156. While shown as a separate data buss for illustration and explanation, it could represent data transferred back on the constant current lines as described above.

To sense errors, a flash a/d converter may measure the voltage Vcc of the processor 152 and provide a digital input of an error voltage to the processor 151, and the processor may make compensating changes in the switching means to control the voltage Vcc. This could be accomplished with any of a number of processing algorithms, but a discussion of some considerations of this process follow.

If the total capacitance is known, a change in voltage from a previous measurement and a time between the successive measurements may be used to calculate a direct quantifier of the current error, so a correct number of switches can be changed quickly to reverse a voltage drift. Further, in anticipation of an operation, and with knowledge of the estimated current required for the operation, the processor can command a change of current at the start of the operation and again at the end. If the estimate is a little off, the error may be corrected by the error algorithm, but this will eliminate the chance of large current mismatches, improving voltage regulation and reducing the size of the capacitor needed.

To show the benefit of having the processor anticipate the load and command a current at the same instant, lets first review the capacitor needed without such control. Assume that the idle current is 30 amperes, and the full load current is 130 amperes. Further assume that the voltage is sampled at 50 ns intervals and that it takes another 50 ns propagation delay to effect a change in current. The current could have an error of 100 amperes for 100 ns before it is corrected. To maintain the voltage within 50 mv, the capacitor would have to be 200 uf. On the other hand, if the processor anticipated and programmed the current to within 10 amperes with precise timing, the maximum error would be 10 amperes for 100 ns, and a 20 uf capacitor would suffice. (This is not the only factor to be considered in sizing the capacitor, so it is likely to be larger regardless).

There is an additional problem in the open loop scenario. At the end of the 100 ns, there is an error voltage of 50 mv. Bringing the converter current into conformance with the load current stops the error from getting worse, but to correct the error would require as much again current to be applied for the next 100 ns. Unless the current capacity of the converter is oversized, that much current may not be available, so it may be necessary just to keep the voltage error from getting worse, but not corrected. All is not lost, though, because at some time the current will change again and the error will be in the other direction, canceling the original error voltage. This suggests that the voltage should controlled to be slightly high at low load, and slightly low for high load. However, this is a usual characteristic of the voltage and current relationship specified for processors.

With the processor anticipating and commanding current changes in real time, the errors will never get as big, resulting in much better voltage regulation.

If it is desired not to involve the processor in the voltage control, a power control co-processor can be used, either embedded on the processor die or separate. A degree of communication for operational and mode changes is desirable none-the-less. Changes in the current source currents at the prime power source require a communication link to that circuit as well.

The invention claimed is:

1. A switched current power converter for an integrated circuit comprising a capacitor for storing a charge to supply a voltage to the integrated circuit a plurality of constant current sources a plurality of switching means, there being one switching means for each of the plurality of constant current sources, each of the plurality of switching means being connected respectively to one of the plurality of constant current sources, each of the plurality of switching means being arranged and disposed so as to have a first switch state in which a current from a respective one of the plurality of constant current source is directed to the capacitor, and each of the plurality of switching means being arranged and disposed so as to have a second switch state in which the current from the respective one of the plurality of constant current source is directed to return, and at least one of the plurality of switching means is a totem pole cell located within the integrated circuit.

2. The switched current power converter of claim 1 further comprising at least one additional constant current source that is connected directly to the capacitor.

3. The switched current power converter of claim 1 wherein at least one of the at least one of the plurality of switching means that is a totem pole cell located within the integrated circuit has a third switch state in which the totem pole cell is open, and further comprising at least one outside switching means, located outside of the integrated circuit, the at least one outside switching means being arranged and disposed so as to have a first switch state in which the current from the respective one of the plurality of constant current sources which is connected to the at least one of the at least one of the plurality of switching means that is a totem pole cell located within the integrated circuit is directed to return outside of the integrated circuit when the at least one of the at least one of the plurality of switching means that is a totem pole cell located within the integrated circuit is open, and the at least one outside switching means has a second switching state in which the at least one outside switching means is open.

4. A data bus driver circuit having a data output comprising a first totem pole cell that is located within an integrated circuit, the first totem pole cell comprising a first switching mean connected between the data output and a return, the first totem pole cell comprising a second switching means connected between the data output and a power distribution circuit within the integrated circuit, the data bus driver circuit further comprising a source of constant current located outside of the integrated circuit and connected to the data output, the first totem pole cell has a first switch state in which the first switching means is closed and the second switching means is open so that the data output is essentially at a potential of the return and current from the source of constant current is directed to the return, and the first totem pole cell has a second switch state in which the first switching means is open and the second switching means is closed so that the data output is essentially at the potential of the power distribution circuit within the integrated circuit and current from the source of constant current is directed to the power distribution circuit within the integrated circuit.

5. The data bus driver circuit of claim 4 wherein the first totem pole cell has a third switch state in which the first switching means and the second switching means are open, and further comprising at least one additional totem pole cell located outside of the integrated circuit, the at least one additional totem pole cell comprising a third switching means connected between the data output and the return, the at least one additional totem pole cell comprising a fourth switching means connected between the data output and the power distribution circuit outside of the integrated circuit, the at least one additional totem pole cell has a first switch state in which the third switching means is closed and the second switching means is open so that the data output is essentially at a potential of the return and current from the source of constant current is directed to the return, and the at least one additional totem pole cell has a second switch state in which the third switching means is open and the fourth switching means is closed so that the data output is essentially at the potential of the power distribution circuit outside of the integrated circuit and current from the source of constant current is directed to the power distribution circuit outside of the integrated circuit.

6. A ballast block for dividing a current from a source of constant current into a plurality smaller constant currents for driving a data bus comprising a plurality of totem pole data drivers each having a data output comprising a plurality of inductor means, one inductor means for each of the plurality of totem pole data drivers, an input end of each of the plurality of inductor means all being connected together in parallel and to the source of constant current and an output end of each of the plurality of inductor means each being connected to a respective data output of a respective one of the plurality of totem pole data drivers.

7. The ballast block of claim 6 wherein the ballast block comprises a block of ferrite having a plurality of through holes therein with wire conductors therein to comprise the plurality of inductor means.

8. The ballast block of claim 6 wherein the ballast block comprises a block of sintered powdered metal having a plurality of through holes therein with wire conductors therein to comprise the plurality of inductor means.

9. The ballast block of claim 6 wherein the ballast block comprises a parallel array of conductors, and the inductor means comprises the self inductance of the conductors of the parallel array of inductors.

\* \* \* \* \*